(12) United States Patent
Carlson et al.

(10) Patent No.: US 8,512,893 B2
(45) Date of Patent: Aug. 20, 2013

(54) MITIGATING RUPTURE AND THERMAL CASCADING OF BATTERY CELLS BY JUDICIOUS ARRANGEMENT OF CELLS INSIDE A PACK

(75) Inventors: Jeremy Robert Carlson, Cary, NC (US); Larry Glenn Estes, Durham, NC (US); Joseph Anthony Holung, Wake Forest, NC (US); Timothy Humphrey, Raleigh, NC (US); Tin-Lup Wong, Chapel Hill, NC (US); Bouziane Yebka, Cary, NC (US)

(73) Assignee: Lenovo (Sinapore) Pte. Ltd., Singapore (SG)

( * ) Notice: Subject to any disclaimer, the term of this patent is extended or adjusted under 35 U.S.C. 154(b) by 1233 days.

(21) Appl. No.: 12/049,337

(22) Filed: Mar. 16, 2008

(65) Prior Publication Data

US 2009/0233165 A1  Sep. 17, 2009

(51) Int. Cl.
*H01M 6/42* (2006.01)
*H01M 6/00* (2006.01)

(52) U.S. Cl.
USPC .......................... 429/149; 29/623.1

(58) Field of Classification Search
None
See application file for complete search history.

(56) References Cited

U.S. PATENT DOCUMENTS 4,303,876 A * 12/1981 Kelly et al. ............... 320/110
6,677,078 B2 * 1/2004 Reise et al. ............... 429/159

FOREIGN PATENT DOCUMENTS

| CN | 1713435 | 12/2005 |
| JP | 2004-355914 | 12/2004 |
| JP | 2007-227171 | 9/2007 |
| JP | 2009-021223 | 1/2009 |

\* cited by examiner

*Primary Examiner* — Barbara Gilliam
*Assistant Examiner* — Stephan Essex
(74) *Attorney, Agent, or Firm* — John L. Rogitz; John M. Rogitz (57) ABSTRACT

The invention described herein includes a method and apparatus comprising a plurality of battery cells electrically coupled to produce at least one voltage at a terminal, wherein the plurality of battery cells includes a plurality of junction areas. Each junction area comprises two battery cells longitudinally arranged such that an end of one battery cell faces an end of another battery cell. In a majority of the junction areas, the venting end of one battery cell does not face the non-venting end of the other battery cell.

20 Claims, 8 Drawing Sheets

MITIGATING RUPTURE AND THERMAL CASCADING OF BATTERY CELLS BY JUDICIOUS ARRANGEMENT OF CELLS INSIDE A PACK

BACKGROUND OF THE INVENTION

1. Technical Field

The present invention relates to arranging battery cells within a battery pack in such a manner as to mitigate battery cell thermal cascading.

2. Description of the Related Art

Lithium-ion battery packs are used extensively in notebook computers, cell phones and other portable equipment primarily because of their relative low cost and high energy storage capability. These battery packs typically include multiple battery cells that have a "venting" end and a "non-venting" end. Meaning, when a battery cell is dented, ruptured, and/or heated, the battery cell may release gases through one of its ends, referred to herein as a "venting end," The opposite end of the venting end typically does not vent gases, referred to herein as a "non-venting end." When one of the battery cells within the battery pack vents gases, the gases may actually cause another one of the battery cells to vent and, in effect, produce a cascading effect throughout the battery pack.

SUMMARY

The invention described herein includes a method and apparatus comprising a plurality of battery cells electrically coupled to produce at least one voltage at a terminal, wherein the plurality of battery cells includes a plurality of junction areas. Each junction area comprises two battery cells longitudinally arranged such that an end of one battery cell faces an end of another battery cell. In a majority of the junction areas, the venting end of one battery cell does not face the non-venting end of the other battery cell.

The invention described herein also includes a method of assembling a battery pack by arranging a plurality of battery cells, which are electrically coupled to produce at least one voltage at a terminal, such that the arrangement results in a plurality of junction areas. Each junction area comprises two battery cells longitudinally arranged such that an end of one battery cell faces an end of another battery cell. In a majority of the junction areas, the venting end of one battery cell does not face the non-venting end of the other battery cell.

The invention described herein also includes an apparatus comprising 1) a housing; 2) components coupled to the housing that draw electrical power from a battery pack; and 3) the battery pack comprising a plurality of battery cells electrically coupled to produce at least one voltage at a terminal, wherein the plurality of battery cells includes a plurality of junction areas. Each junction area comprises two battery cells longitudinally arranged such that an end of one battery cell faces an end of another battery cell. In a majority of the junction areas, the venting end of one battery cell does not face the non-venting end of the other battery cell.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary.

Figure 1A:
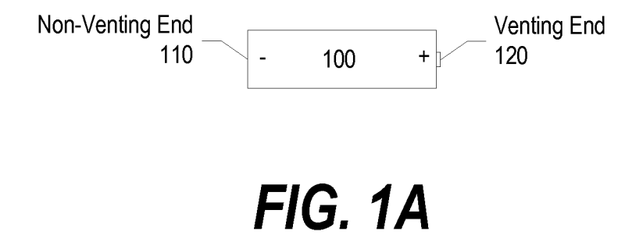
FIG. 1A is a diagram of a battery cell that includes a venting end and a non-venting end.

FIG. 1A is a diagram of a battery cell that includes a venting end and a non-venting end. Battery cell 100 may experience thermal runaway/venting at times at which battery cell 100 is dented, ruptured, and/or heated. When this occurs, battery cell 100 releases gases ("vents") through venting end 120. The embodiment shown in FIG. 1 shows that venting end 120 is a positive polarity and its opposite end, non-venting end 110, is a negative polarity.

Multiple battery cells 100 may be packaged into a battery pack for powering electronic components, such as in a notebook computer, a cell phone, an automobile, etc. These packaged battery cells may thermally "cascade," which is a phenomenon that occurs when the hot venting gases from one battery cell heats up another battery cell causing it to vent hot gases that, in turn, cause another battery cell to vent, etc. Although venting gases of one battery cell are able to thermally penetrate a non-venting end of another battery cell and cause cascading, generally, hot venting gases impinging on a venting end of another battery cell do not cause cascading. The invention described herein minimizes thermal cascading within a battery pack by the arrangement of the battery cells relative to the other battery cells.

Figure 1B:
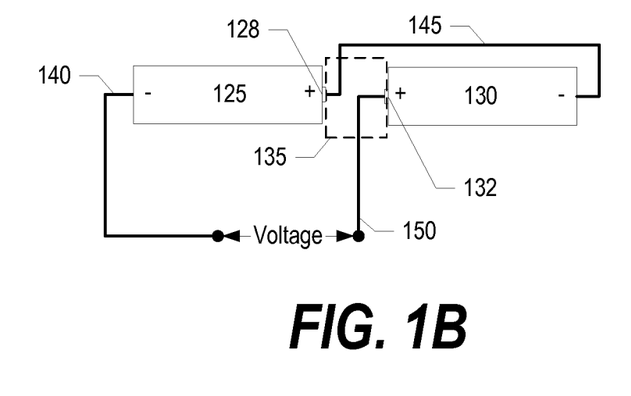
FIG. 1B is a diagram of two battery cells longitudinally arranged and forming a junction area between the two battery cells, wherein the junction area includes a venting end of both of the battery cells.

FIG. 1B is a diagram of two battery cells longitudinally arranged and forming a junction area between the two battery cells, wherein the junction area includes a venting end of both of the battery cells. Battery cells 125 and 130 are longitudinally arranged in a manner that produces junction area 135. Junction area 135 includes the venting ends of both battery cells 125 and 130. As can be seen, venting end 128 faces venting end 132, thus minimizing thermal cascading because hot gases from venting end 128 impinges on the venting end 132, and visa versa.

Batteries 125 and 130 are electrically coupled using wires 140-150. Wire 145 couples battery cell 125's positive polarity (venting end 128) to battery cell 130's negative polarity. As such, a voltage is produced between the open ends of wires 140 and 150.

Figure 1C:
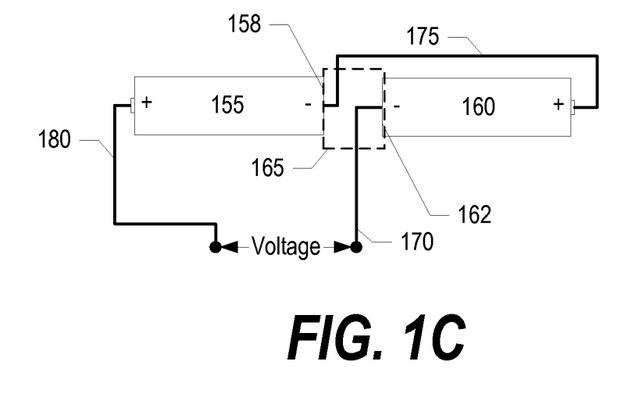
FIG. 1C is a diagram of two battery cells longitudinally arranged and forming a junction area between the two battery cells, wherein the junction area includes a non-venting end of both of the battery cells.

FIG. 1C is a diagram of two battery cells longitudinally arranged and forming a junction area between the two battery cells, wherein the junction area includes a non-venting end of both of the battery cells. Battery cells 155 and 160 are longitudinally arranged in a manner that produces junction area 165. Junction area 165 includes the non-venting ends of both battery cells 155 and 160. As can be seen, non-venting end 158 faces non-venting end 162, thus minimizing thermal cascading because the venting ends of battery cells 155 and 160 are facing away from the other battery cell and not included in junction area 165.

Batteries 155 and 160 are electrically coupled using wires 170-180. Wire 175 couples battery cell 160's positive polarity to battery cell 155's negative polarity (non-venting end 158). As such, a voltage is produced between the open ends of wires 170 and 180.

Figure 2A:
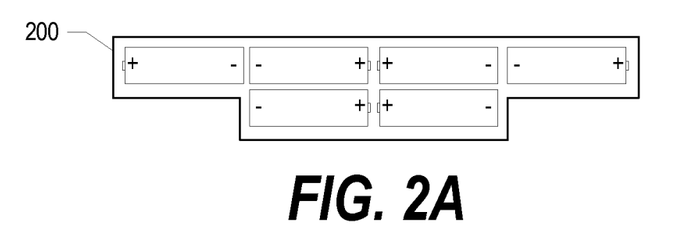
FIG. 2A is a diagram of a six-cell battery pack whose junction areas include two battery cell non-venting ends or two battery cell venting ends.

FIG. 2A is a diagram of a six-cell battery pack whose junction areas include two battery cell non-venting ends or two battery cell venting ends. Battery pack 200 includes two rows of longitudinally arranged battery cells. The first row includes four battery cells and the second row includes two battery cells. As can be seen, for each junction area produced by two longitudinally arranged battery cells, each junction area includes either a combination of battery cell venting ends or a combination of battery cell non-venting ends. Therefore, when one of the battery cells vents, the gases do not penetrate through an adjacent battery cell's non-venting end, thus minimizing thermal cascading.

Figure 2B:
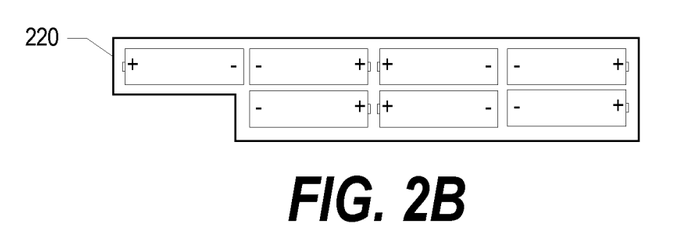
FIG. 2B is a diagram of a seven-cell battery pack whose junction areas include two battery cell non-venting ends or two battery cell venting ends.

FIG. 2B is a diagram of a seven-cell battery pack whose junction areas include two battery cell non-venting ends or two battery cell venting ends. Battery pack 220 includes two rows of longitudinally arranged battery cells. The first row includes four battery cells and the second row includes three battery cells. As can be seen, for each junction area produced by two longitudinally arranged battery cells, each junction area includes either a combination of battery cell venting ends or a combination of battery cell non-venting ends. And, as discussed above, when one of the battery cells vents, the gases do not penetrate through an adjacent battery cell's non-venting end, thus minimizing thermal cascading.

Figure 2C:
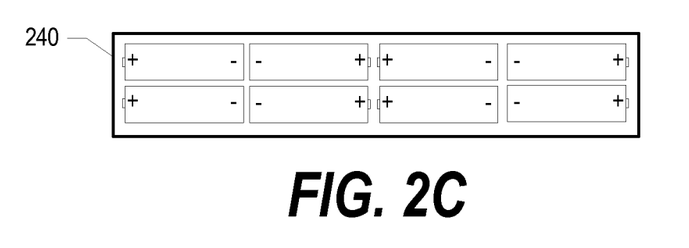
FIG. 2C is a diagram of an eight-cell battery pack whose junction areas include two battery cell non-venting ends or two battery cell venting ends.

FIG. 2C is a diagram of an eight-cell battery pack whose junction areas include two battery cell non-venting ends or two battery cell venting ends. Battery pack 240 includes two rows of longitudinally arranged battery cells. The first row includes four battery cells and the second row includes four battery cells. Again, as can be seen, each junction area within battery pack 240 includes either a combination of battery cell venting ends or a combination of battery cell non-venting ends, thus minimizing thermal cascading.

Figure 3A:
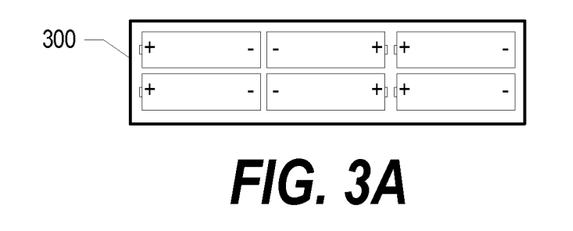
FIG. 3A is a diagram of a six-cell battery pack whose junction areas include two battery cell non-venting ends or two battery cell venting ends.

FIG. 3A is a diagram of a six-cell battery pack whose junction areas include two battery cell non-venting ends or two battery cell venting ends. Battery pack 300 includes two rows of longitudinally arranged battery cells. The first row includes three battery cells and the second row includes three battery cells. As can be seen, each junction area within battery pack 300 includes either a combination of battery cell venting ends or a combination of battery cell non-venting ends, thus minimizing thermal cascading.

Figure 3B:
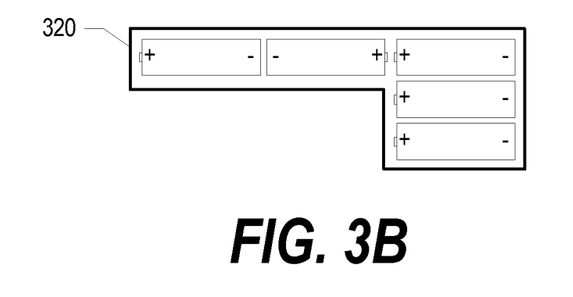
FIG. 3B is a diagram of a five-cell battery pack whose junction areas include two battery cell non-venting ends or two battery cell venting ends.

FIG. 3B is a diagram of a five-cell battery pack whose junction areas include two battery cell non-venting ends or two battery cell venting ends. Battery pack 320 includes one row of longitudinally arranged battery cells and two other battery cells that are not longitudinally arranged with another battery cell. As can be seen, each junction area within battery pack 320 includes either a combination of battery cell venting ends or a combination of battery cell non-venting ends, thus minimizing thermal cascading.

Figure 3C:
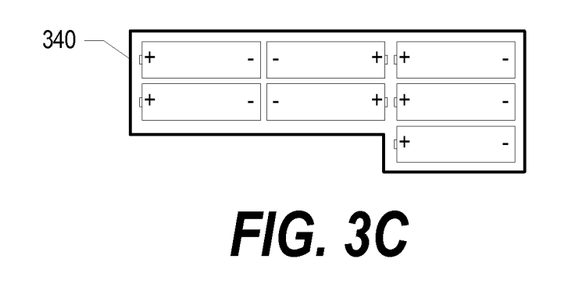
FIG. 3C is a diagram of a seven-cell battery pack whose junction areas include two battery cell non-venting ends or two battery cell venting ends.

FIG. 3C is a diagram of a seven-cell battery pack whose junction areas include two battery cell non-venting ends or two battery cell venting ends. Battery pack 340 includes two rows of longitudinally arranged battery cells and one stand-alone battery cell. The first row includes three battery cells and the second row includes three battery cells. As can be seen, each junction area within battery pack 340 includes either a combination of battery cell venting ends or a combination of battery cell non-venting ends, thus minimizing thermal cascading.

Figure 3D:
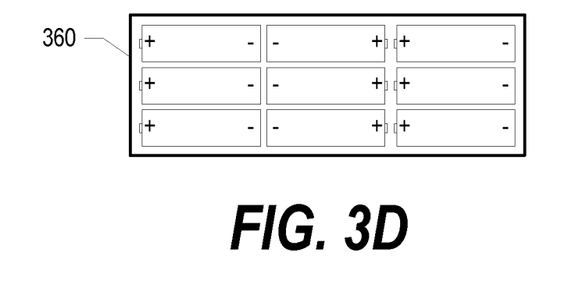
FIG. 3D is a diagram of a nine-cell battery pack whose junction areas include two battery cell non-venting ends or two battery cell venting ends.

FIG. 3D is a diagram of a nine-cell battery pack whose junction areas include two battery cell non-venting ends or two battery cell venting ends. Battery pack 360 includes three rows of longitudinally arranged battery cells, each row including three battery cells. Again, each junction area within battery pack 360 includes either a combination of battery cell venting ends or a combination of battery cell non-venting ends, thus minimizing thermal cascading.

Figure 4A:
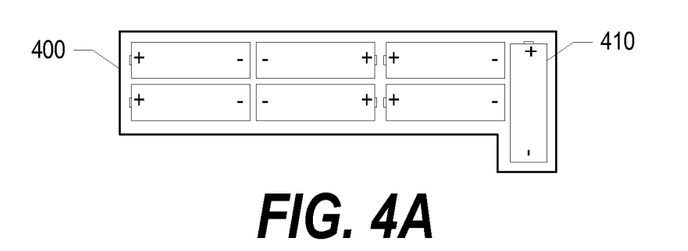
FIG. 4A is a diagram of a seven-cell battery pack whose junction areas include two battery cell non-venting ends or two battery cell venting ends, wherein one of the battery cells is perpendicularly arranged to the other battery cells.

FIG. 4A is a diagram of a seven-cell battery pack that includes one of the battery cells perpendicularly arranged to the other battery cells. Battery pack 400 includes two rows of longitudinally arranged battery cells and one perpendicularly arranged battery cell (battery cell 410). The junction areas produced by the longitudinally arranged battery cells include either a combination of battery cell venting ends or a combination of battery cell non-venting ends, thus minimizing thermal cascading. Battery cell 410 is not longitudinally arranged with another battery cell and, therefore, no junction area is created at the venting end of battery cell 410. As a result, thermal cascading is minimized.

Figure 4B:
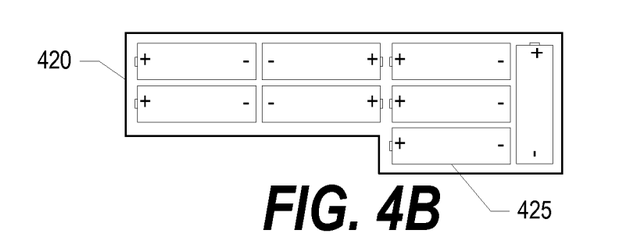
FIG. 4B is a diagram of an eight-cell battery pack whose junction areas include two battery cell non-venting ends or two battery cell venting ends, wherein one of the battery cells is perpendicularly arranged to the other battery cells.

FIG. 4B is a diagram of an eight-cell battery pack whose junction areas include two battery cell non-venting ends or two battery cell venting ends, wherein one of the battery cells is perpendicularly arranged to the other battery cells. Battery pack 420 is similar to battery pack 400 shown in FIG. 4A with the addition of one battery cell 425. As can be seen, battery cell 425 is not longitudinally arranged with another battery cell and, therefore, no junction area is created at the venting end of battery cell 425. As a result, thermal cascading is minimized.

Figure 4C:
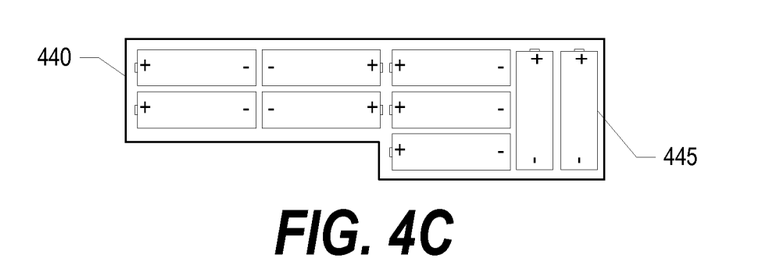
FIG. 4C is a diagram of a nine-cell battery pack whose junction areas include two battery cell non-venting ends or two battery cell venting ends, wherein two of the battery cells are perpendicularly arranged to the other battery cells.

FIG. 4C is a diagram of a nine-cell battery pack whose junction areas include two battery cell non-venting ends or two battery cell venting ends, wherein two of the battery cells are perpendicularly arranged to the other battery cells. Battery pack 440 is similar to battery pack 420 shown in FIG. 4B with the addition of one battery cell 445. As can be seen, battery cell 445 is not longitudinally arranged with another battery cell and, therefore, no junction area is created at the venting end of battery cell 445. As a result, thermal cascading is minimized.

Figure 4D:
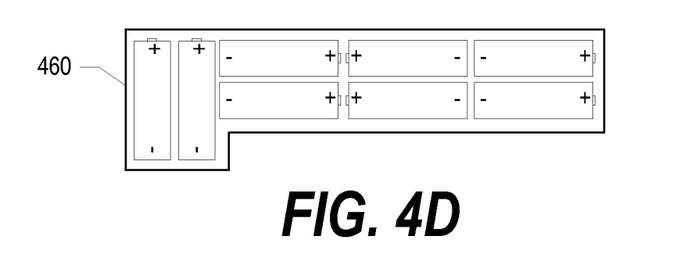
FIG. 4D is a diagram of a nine-cell battery pack whose junction areas include two battery cell non-venting ends or two battery cell venting ends, wherein two of the battery cells are perpendicularly arranged to the other battery cells.

FIG. 4D is a diagram of a nine-cell battery pack whose junction areas include two battery cell non-venting ends or two battery cell venting ends, wherein two of the battery cells are perpendicularly arranged to the other battery cells. Battery pack 460 includes two rows of longitudinally arranged battery cells and two perpendicularly arranged battery cells. As can be seen, the junction areas produced by the longitudinally arranged battery cells include either a combination of battery cell venting ends or a combination of battery cell non-venting ends. In addition, the perpendicularly arranged battery cells are not longitudinally arranged with other battery cells and, therefore, no junction areas are created. As a result, thermal cascading is minimized.

Figure 5A:
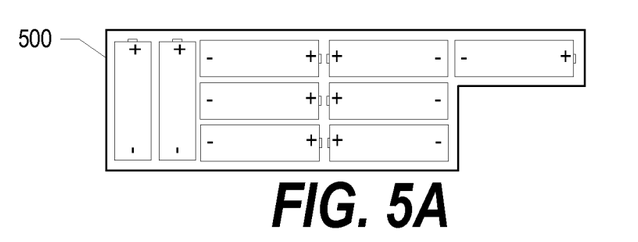
FIG. 5A is a diagram of a nine-cell battery pack whose junction areas include two battery cell non-venting ends or two battery cell venting ends, wherein two of the battery cells are perpendicularly arranged to the other battery cells.

FIG. 5A is a diagram of a nine-cell battery pack whose junction areas include two battery cell non-venting ends or two battery cell venting ends, wherein two of the battery cells are perpendicularly arranged to the other battery cells. Battery pack 500 includes three rows of longitudinally arranged battery cells and two perpendicularly arranged battery cells. As can be seen, the junction areas produced by the longitudinally arranged battery cells include either a combination of battery cell venting ends or a combination of battery cell non-venting ends. In addition, the perpendicularly arranged battery cells are not longitudinally arranged with other battery cells and, therefore, no junction areas are created. Therefore, thermal cascading is minimized.

Figure 5B:
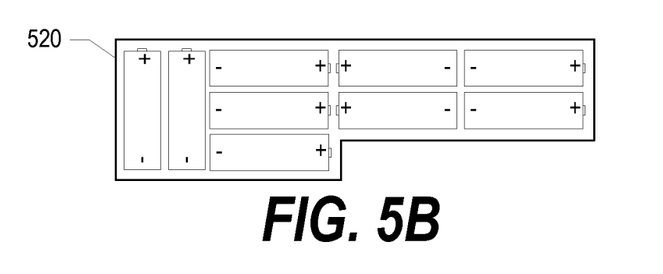
FIG. 5B is a diagram of a nine-cell battery pack whose junction areas include two battery cell non-venting ends or two battery cell venting ends, wherein two of the battery cells are perpendicularly arranged to the other battery cells.

FIG. 5B is a diagram of a nine-cell battery pack whose junction areas include two battery cell non-venting ends or two battery cell venting ends, wherein two of the battery cells are perpendicularly arranged to the other battery cells. Battery pack 520 includes two rows of longitudinally arranged battery cells, one stand-alone battery cell, and two perpendicularly arranged battery cells. Again, as can be seen, the junction areas produced by the longitudinally arranged battery cells include either a combination of battery cell venting ends or a combination of battery cell non-venting ends. In addition, the perpendicularly arranged battery cells are not longitudinally arranged with other battery cells and, therefore, no junction areas are created. Therefore, thermal cascading is minimized.

Figure 6A:
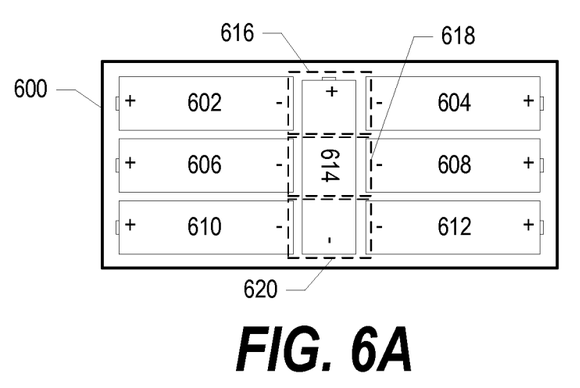
FIG. 6A is a diagram of a seven-cell battery pack that includes one interstitial cell perpendicularly inserted along the longitudinally arrangement of the battery cells.

FIG. 6A is a diagram of a seven-cell battery pack that includes one interstitial battery cell perpendicularly inserted within junction areas formed by longitudinally arranged battery cells. Battery pack 600 includes three rows of longitudinally arranged battery cells. Battery cells 602-604 form a first row, battery cells 606-608 form a second row, and battery cells 610-612 form a third row. The three rows form junction areas 616 through 620, respectively. As can be seen, each of junction areas 616 through 620 include non-venting ends of their respective battery cells. Battery cell 614 is inserted perpendicular to battery cells 602-612 and is located within junction areas 616-620. Since battery cell 614 is not longitudinally arranged with another battery cell, no junction area is created using battery cell 614, this minimizing thermal cascading.

Figure 6B:
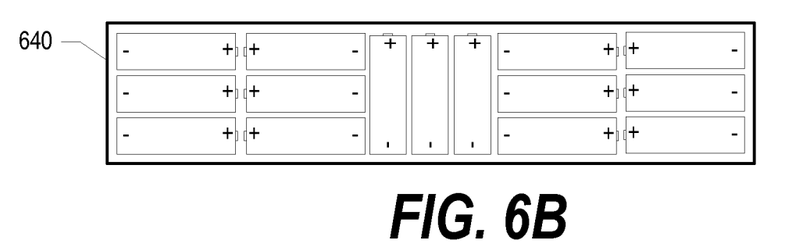
FIG. 6B is a diagram of a fifteen-cell battery pack that includes three interstitial cell perpendicularly inserted along the longitudinally arrangement of the battery cells.

FIG. 6B is a diagram of a fifteen-cell battery pack that includes three interstitial battery cells perpendicularly inserted along the longitudinally arrangement of other battery cells. Battery pack 640 includes three rows of longitudinally arranged battery cells and three interstitial battery cells perpendicularly inserted within junction areas formed by the longitudinally arranged battery cells. As can be seen, the junction areas produced by the longitudinally arranged battery cells include either a combination of battery cell venting ends or a combination of battery cell non-venting ends. In addition, the perpendicularly arranged battery cells are not longitudinally arranged with other battery cells and, therefore, no junction areas are created. Therefore, thermal cascading is minimized.

Figure 6C:
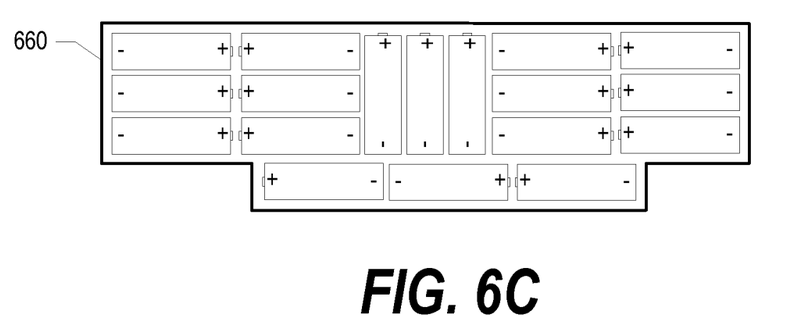
FIG. 6C is a diagram of an eighteen-cell battery pack that includes three interstitial cell perpendicularly inserted along the longitudinally arrangement of the battery cells.

FIG. 6C is a diagram of an eighteen-cell battery pack that includes three interstitial battery cells perpendicularly inserted along the longitudinally arrangement of the battery cells. Battery pack 660 includes four rows of longitudinally arranged battery cells and three interstitial battery cells perpendicularly inserted within junction areas formed by three of the longitudinally arranged battery cell rows. As can be seen, the junction areas produced by the longitudinally arranged battery cells include either a combination of battery cell venting ends or a combination of battery cell non-venting ends. In addition, the perpendicularly arranged battery cells are not longitudinally arranged with other battery cells and, therefore, no junction areas are created. Therefore, thermal cascading is minimized.

Figure 7:
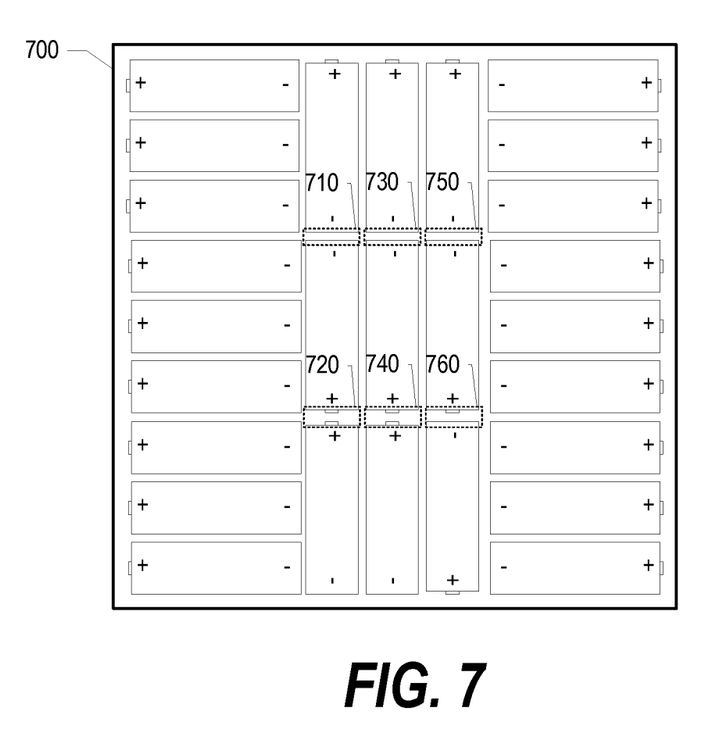
FIG. 7 is a diagram of a twenty seven-cell battery pack that includes perpendicular longitudinally arranged battery cells, wherein in a majority of junction areas, a venting end of one battery cell does not face a non-venting end of the other battery cell.

FIG. 7 is a diagram of a twenty seven-cell battery pack that includes perpendicular longitudinally arranged battery cells, wherein in a majority of junction areas, a venting end of one battery cell does not face a non-venting end of the other battery cell. Battery pack 700 includes twelve rows of longitudinally arranged battery cells, three rows of which being perpendicular to the other nine rows.

The nine longitudinally arranged battery cell rows form junction areas that include non-venting ends of their respective battery cells. The three longitudinally arranged perpendicular rows each include three battery cells that form two junction areas. The first perpendicular row includes junction areas 710-720; the second perpendicular row includes junction areas 730-740; and the third perpendicular row includes junction areas 750-760. Junction areas 710, 730, and 750 include non-venting ends of their respective battery cells. Junction areas 720 and 740 include venting ends of their respective battery cells. Junction 760, however, includes a venting end of one battery cell and a non-venting end of another battery cell. Although junction area 760 does not minimize thermal cascading, the other junction areas within battery pack 700 minimize thermal cascading. Therefore, a majority of the junction areas within battery pack 700 minimize thermal cascading.

Figure 8A:
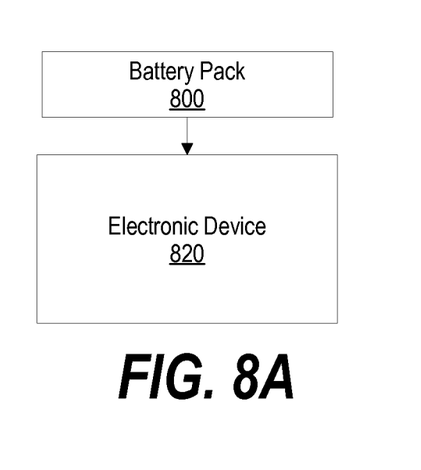
FIG. 8A is a diagram of a battery pack that includes battery cells arranged as described herein providing electrical power to an electronic device.

FIG. 8A is a diagram of battery pack 800 that includes battery cells arranged in a manner that mitigates thermal cascading and provides electrical power to electronic device 820 (e.g., notebook computer, cell phone, camera, etc.). Electronic device 820 includes components that draw electrical power from the battery pack. The components may include a backlight display, processors, memory, a motherboard, input/output devices such as keyboards and touch screens, wireless radios, etc.

Figure 8B:
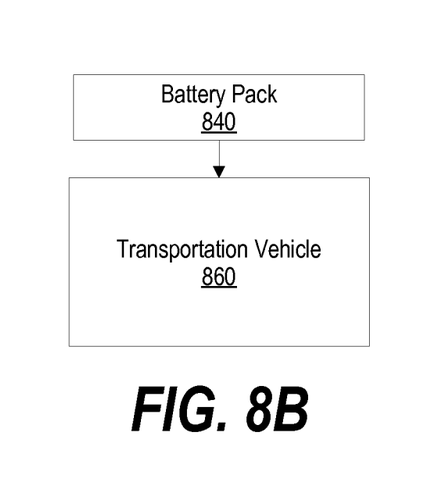
FIG. 8B is a diagram of a battery pack that includes battery cells arranged as described herein providing electrical power to a transportation vehicle.

FIG. 8B is a diagram of battery pack 840 that includes battery cells arranged in a manner that mitigates thermal cascading and provides electrical power to transportation vehicle 860 (e.g., electric car, electric bus, electric motorcycle, etc.). Transportation vehicle 860 includes components that draw electrical power from the battery pack. The components may include electric motors, electronic circuitry, computers, lighting, gauges, audio systems, GPS systems, and other embedded electronic devices such as previously-described electronic device 820.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An apparatus comprising:
   a plurality of battery cells electrically coupled to produce at least one voltage at a terminal, wherein the plurality of battery cells includes a plurality of junction areas, wherein each junction area comprises two battery cells longitudinally arranged such that an end of one battery cell faces an end of another battery cell; and
   wherein in a majority of the junction areas, a venting end of one battery cell does not face a non-venting end of the other battery cell; and
   wherein at least one junction area comprises at least one non-venting end of one battery cell facing at least one non-venting end of another battery cell; and
   wherein at least one junction area comprises at least one venting end of one battery cell facing at least one venting end of another battery cell, wherein the non-venting end of the plurality of battery cells are of a first polarity and the venting ends of the plurality of battery cells are of a second polarity different from the first polarity.

2. The apparatus of claim 1 wherein the non-venting end of the battery cells is a negative polarity and the venting end of the battery cells is a positive polarity.

3. The apparatus of claim 1 wherein the plurality of battery cells includes at least one interstitial battery cell inserted along the longitudinally arrangement of battery cells, the at least one interstitial battery cell being arranged perpendicular to the longitudinal arrangement.

4. The apparatus of claim 1, wherein at least a first cell is arranged orthogonal to an arrangement of at least a second cell with a third cell, the arrangement of the second and third cells forming at least one junction area.

5. The apparatus of claim 1, wherein the plurality of battery cells includes at least one cell that is not arranged with another cell to form a junction area.

6. The apparatus of claim 1, wherein at least one junction area comprises at least one non-venting end of one battery cell facing at least one venting end of another battery cell.

7. An apparatus comprising:
   a housing;
   a battery pack, the battery pack comprising:
   a plurality of battery cells electrically coupled to produce at least one voltage at a terminal, wherein the plurality of battery cells includes a plurality of junction areas, wherein each junction area comprises two battery cells longitudinally arranged such that an end of one battery cell faces an end of another battery cell; and
   components coupled to the housing, the components drawing electrical power from the battery pack;
   wherein in a majority of the junction areas, a venting end of one battery cell does not face a non-venting end of the other battery cell;
   wherein at least one junction area comprises at least one non-venting end of one battery cell facing at least one non-venting end of another battery cell; and
   wherein at least one junction area comprises at least one venting end of one battery cell facing at least one venting end of another battery cell, wherein the non-venting end of the plurality of battery cells are of a first polarity and the venting ends of the plurality of battery cells are of a second polarity different from the first polarity.

8. The apparatus of claim 7 wherein the non-venting end of the battery cells is a negative polarity and the venting end of the battery cells is a positive polarity.

9. The apparatus of claim 7 wherein the non-venting end is an end opposite of the venting end.

10. The apparatus of claim 7 wherein the plurality of battery cells includes at least one interstitial battery cell inserted along the longitudinally arrangement of battery cells, the at least one interstitial battery cell being arranged perpendicular to the longitudinal arrangement.

11. The apparatus of claim 7 wherein each of the plurality of battery cells is cylindrically shaped.

12. The apparatus of claim 7, wherein at least a first cell is arranged orthogonal to an arrangement of at least a second cell with a third cell, the arrangement of the second and third cells forming at least one junction area.

13. The apparatus of claim 7, wherein the plurality of battery cells includes at least one cell that is not arranged with another cell to form a junction area.

14. The apparatus of claim 7, wherein at least one junction area comprises at least one non-venting end of one battery cell facing at least one venting end of another battery cell.

15. A method of assembling a battery pack, the method comprising:
arranging a plurality of battery cells electrically coupled to produce at least one voltage at a terminal, wherein the arrangement results in the plurality of battery cells creating a plurality of junction areas, wherein each junction area comprises two battery cells longitudinally arranged such that an end of one battery cell faces an end of another battery cell;
wherein in a majority of the junction areas, a venting end of one battery cell does not face a non-venting end of the other battery cell; and
wherein at least one junction area comprises at least one non-venting end of one battery cell facing at least one non-venting end of another battery cell; and
wherein at least one junction area comprises at least one venting end of one battery cell facing at least one venting end of another battery cell, wherein the non-venting end of the plurality of battery cells are of a first polarity and the venting ends of the plurality of battery cells are of a second polarity different from the first polarity.

16. The method of claim 15 wherein the non-venting end of the battery cells is a negative polarity and the venting end of the battery cells is a positive polarity.

17. The method of claim 15 wherein the plurality of battery cells includes at least one interstitial battery cell inserted along the longitudinally arrangement of battery cells, the at least one interstitial battery cell being arranged perpendicular to the longitudinal arrangement.

18. The method of claim 15, wherein at least a first cell is arranged orthogonal to an arrangement of at least a second cell with a third cell, the arrangement of the second and third cells forming at least one junction area.

19. The method of claim 15, wherein the plurality of battery cells includes at least one cell that is not arranged with another cell to form a junction area.

20. The method of claim 15, wherein at least one junction area comprises at least one non-venting end of one battery cell facing at least one venting end of another battery cell.

* * * * *